United States Patent [19]
Sasaki et al.

[11] Patent Number: 5,670,094
[45] Date of Patent: Sep. 23, 1997

[54] METHOD OF AND APPARATUS FOR PRODUCING OZONIZED WATER

[75] Inventors: Kenichi Sasaki; Takayuki Saito; Ken Nakajima; Mitsuru Imai, all of Kanagawa-ken, Japan

[73] Assignee: Ebara Corporation, Tokyo, Japan

[21] Appl. No.: 590,361

[22] Filed: Jan. 25, 1996

[30] Foreign Application Priority Data

Jan. 30, 1995 [JP] Japan ................... 7-031866

[51] Int. Cl.$^6$ ................................................ B01F 3/04
[52] U.S. Cl. ................ 261/27; 261/122.1; 261/DIG. 42
[58] Field of Search .................... 261/DIG. 42, 122.1, 261/104, 27

[56] References Cited

U.S. PATENT DOCUMENTS

| | | | |
|---|---|---|---|
| 2,812,861 | 11/1957 | Bickford | 261/DIG. 42 |
| 4,355,636 | 10/1982 | Oetjen et al. | 261/104 |
| 4,555,335 | 11/1985 | Burris | 261/DIG. 42 |
| 4,836,929 | 6/1989 | Baumann et al. | |
| 4,897,359 | 1/1990 | Oakley et al. | 261/122.1 |
| 4,992,216 | 2/1991 | Saita et al. | |
| 5,037,610 | 8/1991 | Fukasawa et al. | 261/122.1 |
| 5,073,268 | 12/1991 | Saito et al. | |

FOREIGN PATENT DOCUMENTS

| | | |
|---|---|---|
| 0 362 164 A2 | 4/1990 | European Pat. Off. |
| 0 433 893 A2 | 6/1991 | European Pat. Off. |
| 63-158190 | 11/1988 | Japan |
| 6-47105 | 8/1991 | Japan |
| 4-4090 | 1/1992 | Japan |
| 4-326988 | 11/1992 | Japan |
| 4-326988 | 3/1993 | Japan |
| 6-39256 | 2/1994 | Japan |
| 6-031286 | 5/1994 | Japan |

*Primary Examiner*—Tim R. Miles
*Attorney, Agent, or Firm*—Armstrong, Westerman, Hattori, McLeland & Naughton

[57] ABSTRACT

In an ozonized water producing apparatus in which a pressurized ozone gas generated by an electric discharge type ozonizer is dissolved in water to be treated through a porous hollow-fiber membrane, an infinite variable-speed control type pump is provided upstream of the hollow-fiber membrane to maintain the water pressure inside the hollow fibers higher than the ozone gas pressure and to control the water pressure and flow rate, and a control mechanism is provided to control the ozone concentration in the treated water on the basis of the ozone gas concentration. Thereby treated water containing neither tiny bubbles nor impurities is obtained, and the concentration, flow rate and pressure of the treated water are controlled at constant levels.

13 Claims, 5 Drawing Sheets

METHOD OF AND APPARATUS FOR PRODUCING OZONIZED WATER

BACKGROUND OF THE INVENTION

1. Field of the Art

The present invention relates to the production of ozonized water and, more particularly, to a method of and an apparatus for producing high-purity ozonized water which can be used in precision machinery, electronic, medical and food industries and the like.

2. Prior Art

Hitherto, a technique of producing ozonized water by dissolving ozone in water has been employed in the food and medical industries or in the field of medical treatment, mainly for producing sterilized water. There have been known ozonized water producing apparatuses in which an electric discharge type or water electrolysis type ozonizer is used as an ozonizer, and an ozone gas generated by the ozonizer is dissolved in water by any of the following methods: ① an aeration method; ② a mixing dissolution method that uses a line mixer or an ejector; and ③ a diffuser filter method that uses a filter made of porous glass or fusion-bonded titanium short-fiber material, or a Teflon membrane treated so as to become hydrophilic. A method has also been presented in which water to be treated is supplied directly into the anode chamber of an electrolytic cell of a water electrolysis type ozonizer so as to be brought into contact with ozone, thereby producing ozonized water. Another method is one in which a diffuser filter in the form of a hollow-fiber module is used as an ejector.

However, in all the conventional techniques, importance is attached to the use of ozonized water as sterilized water for foods or the like, and the conventional techniques principally aim at increasing the ozone concentration in the treated water rather than reducing the impurity content in the ozonized water. In a case where ozonized water of high concentration is to be produced by the aeration method or ejector method according to the conventional technique, a gas is diffused as bubbles in water to be treated. Therefore, many of the conventional processes are characterized in that the gas pressure is maintained higher than the water pressure. Further, the pore diameter of a membrane used as a diffuser membrane is relatively large, i.e. from several μm to 10 μm, because the gas diffusion efficiency is regarded as important.

With the conventional techniques, although ozonized water of high concentration can be obtained, if an electric discharge type ozonizer is used, fine particles of a heavy metal or the like are generated from a member in the neighborhood of an electric discharge member. Therefore, a gas containing such fine particles is diffused directly in water to be treated, resulting in an increase of the impurity concentration in the water. Further, with the above-described conventional techniques, tiny bubbles remain in the treated water; this may unfavorably cause unevenness on an ozonized water-treated surface when the ozonized water is used in the electronic industry or in the field of precision machining. In order to prevent such tiny bubbles from getting mixed in the treated water, it is necessary to control the water pressure and flow rate at constant levels.

Further, it is essential to maintain the pressure and flow rate constant when ozonized water is to be supplied to a use point by piping, or in a case where ozonized water is to be supplied to an RCA cleaning tank used in the field of electronics, and mixed with another chemical before being actually used. In the conventional aeration and ejector methods, since the water pressure is made lower than the gas pressure, it is difficult to control the water flow rate and pressure, and, therefore, the produced ozonized water must be supplied through a pump. Therefore, problems such as the durability of the pump itself, the elution of impurities from a pump member caused by ozone, etc. arise. Accordingly, it is difficult to use the ozonized water for precision cleaning or electronic industrial purposes.

Under these circumstances, an object of the present invention is to solve the above-described problems and to provide a method of and an apparatus for producing high-purity ozonized water, whereby treated water containing neither tiny bubbles nor impurities is obtained, and the concentration, flow rate and pressure of the treated water are easily controlled at constant levels.

SUMMARY OF THE INVENTION

To solve the above-described problems, the present invention provides an ozonized water producing method in which a pressurized ozone gas generated by an electric discharge type ozonizer is dissolved in water to be treated through a hollow-fiber membrane, characterized in that the water pressure inside the hollow-fiber membrane is maintained higher than the pressure of the ozone gas supplied to the outside of the hollow-fiber membrane to prevent tiny bubbles and impurities from getting mixed in the water being treated, and the ozone concentration in treated water is controlled on the basis of concentration of the ozone gas.

In addition, the present invention provides an ozonized water producing apparatus in which a pressurized ozone gas generated by an electric discharge type ozonizer is dissolved in water to be treated through a hollow-fiber membrane, characterized by comprising: an infinite variable-speed control type pump which is provided upstream of the hollow-fiber membrane to maintain the water pressure inside the hollow fibers higher than a pressure of the ozone gas supplied to the outside of the hollow-fiber membrane and to control the water pressure and flow rate; and a control mechanism for controlling an ozone concentration in the treated water on the basis of concentration of the ozone gas.

In the present invention, it is preferable that the water pressure in the hollow-fiber membrane should be higher than the ozone gas pressure by 0.1 kg·f/cm² or more, to positively maintain the water pressure higher than the ozone gas pressure.

In the above-described apparatus, it is preferable to provide a flowmeter and a pressure gauge upstream of the hollow-fiber membrane, and a control mechanism which processes signal values output from the flowmeter and the pressure gauge in an arithmetic circuit to control the infinite variable-speed control type pump. Further, it is preferable for the ozone concentration control mechanism to include: an ozonized water concentration meter provided downstream of the hollow-fiber membrane; an arithmetic circuit for processing a value measured by the concentration meter; and a voltage varying device for varying the discharge voltage of the electric discharge type ozonizer on the basis of the processed value.

Thus, in the present invention, when a pressurized ozone gas generated by an electric discharge type ozonizer is dissolved in water to be treated through a hollow-fiber membrane, the water pressure inside the hollow-fiber membrane is maintained higher than the ozone gas pressure, and the water pressure and flow rate are controlled by the infinite variable-speed control type pump, which is provided upstream of the hollow-fiber membrane, thereby preventing tiny bubbles and impurities from getting mixed in the water being treated and maintaining the water flow rate and pressure at constant levels. Moreover, the ozone concentration in the treated water is measured with the ozone gas concentration mechanism, which preferably includes an ozonized water concentration meter which is provided downstream of the hollow-fiber membrane, and the gas concentration is varied on the basis of the measured value, thereby maintaining the ozone concentration in the treated water at a constant level.

The above and other objects, features and advantages of the present invention will become more apparent from the following description when taken in conjunction with the accompanying drawings in which preferred embodiments of the present invention are shown by way of illustrative examples.

DETAILED DESCRIPTION OF THE INVENTION

Figure 1:
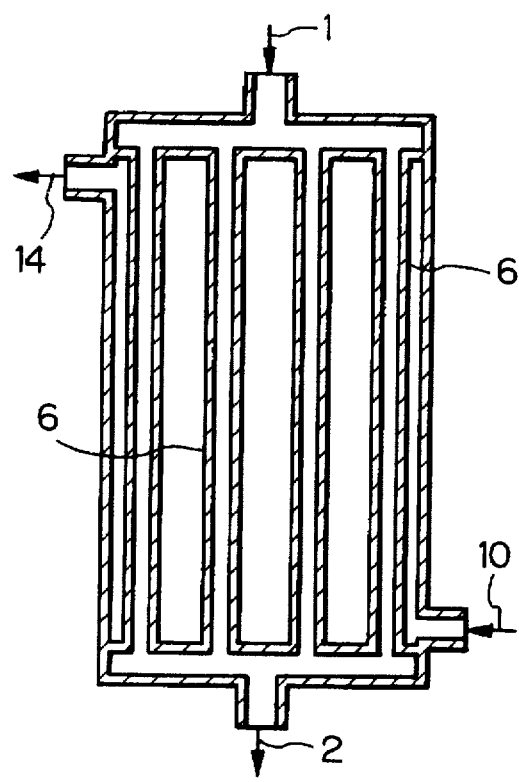
FIG. 1 schematically shows the structure of a hollow-fiber membrane used in the ozonized water producing apparatus of the present invention.

The present invention will be described below more specifically referring to the drawings which illustrate a preferred embodiment of the invention.

Figure 2:
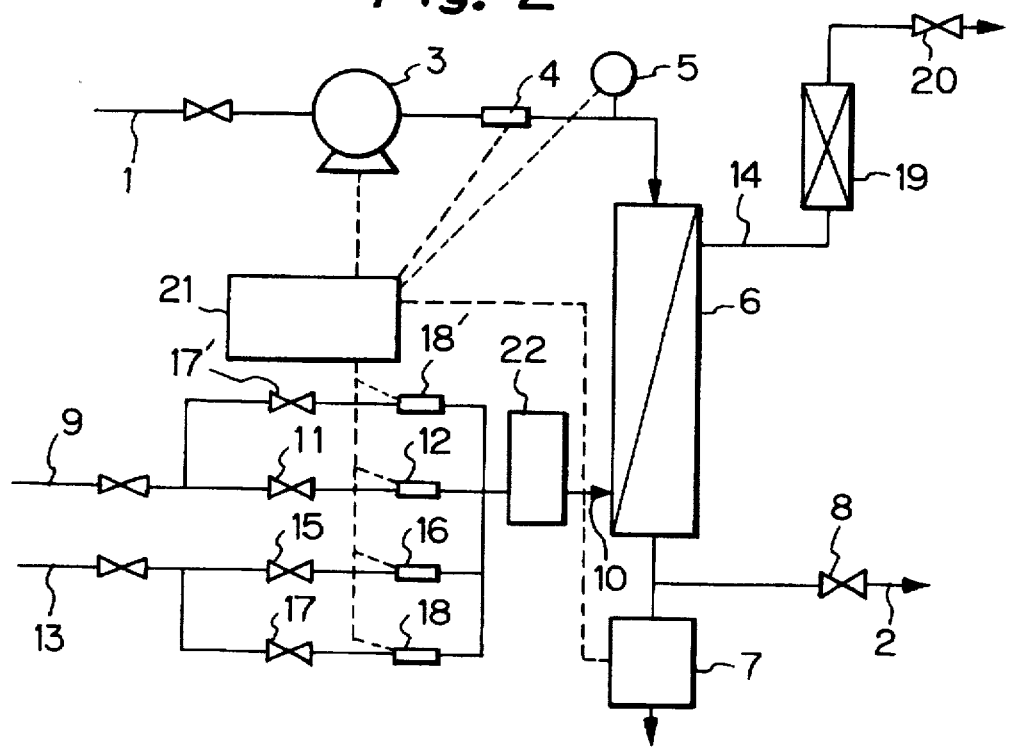
FIG. 2 is a flow sheet used to explain an ozonized water producing apparatus according to an embodiment of the present invention.

FIGS. 1 and 2 illustrate an ozonized water producing apparatus according to an embodiment of the present invention.

A gas dissolving membrane that is employed in the ozonized water producing apparatus is a polytetrafluoroethylene porous hydrophobic membrane which is permeable to gases, e.g. oxygen, nitrogen, etc., but impermeable to water, and which has a pore diameter distribution centered in the range of from 0.01 μm to 1 μm, previously proposed by the present applicant (Japanese Patent Application Unexamined Publication (KOKAI) No. 3-188988). The membrane has a hollow-fiber structure. As shown in FIG. 1, which is a schematic illustration of the membrane structure, water flows inside hollow fibers, and a gas flows outside them.

FIG. 2 illustrates the flow of the high-purity ozonized water producing apparatus according to the one embodiment of the present invention.

In FIG. 2, water 1 to be treated passes through a pump 3, a flowmeter 4 and a pressure gauge 5 and then flows through a hollow-fiber membrane 6 in a down-flow manner. The treated water is branched at the outlet side of the hollow-fiber membrane 6 so as to be introduced into an ozonized water concentration meter 7 to measure an ozone concentration in the treated water. Regarding the gas, oxygen gas 9 and nitrogen gas 13, which are raw material gases, are separately introduced into an electric discharge type ozonizer 22, or a mixed gas of oxygen and nitrogen is introduced into the electric discharge type ozonizer 22, thereby generating an ozone gas 10. The ozone gas 10 is supplied to the hollow-fiber membrane 6 so as to flow outside the hollow fibers in an up-flow manner. Exhaust gas 14 is treated in an ozone decomposing tower 19 which is provided downstream of the hollow-fiber membrane 6.

As to the above-described pump 3, it is preferable to use an infinite variable-speed control type pump which employs hydrodynamic bearings so as to have no mechanical contact and to prevent generation of fine particles from the inside of the pump, and which also employs a high-purity ceramics material and a tetrafluoride resin material as materials of liquid contact portions thereof in order to prevent elution of metallic ions. The variable speed control of the pump 3 is effected by PDI control in which signal values output from the flowmeter 4 with a transmitter and the pressure gauge 5 with a transmitter, which are provided between the pump 3 and the inlet of the hollow-fiber membrane 6, are processed in an arithmetic circuit 21, e.g. a sequencer, to vary the speed of rotation of the pump 3, thereby maintaining the water pressure higher than the gas pressure by 0.1 kg·f/cm² or more at the outlet of the hollow-fiber membrane 6, and thus preventing the gas from getting mixed in the water in the form of bubbles when the gas is dissolved in the water through the hollow-fiber membrane 6.

It should be noted that the pressure gradient across the hollow-fiber membrane 6 is known and, therefore, the water pressure at the outlet of the hollow-fiber membrane 6 can be detected by the pressure gauge 5 provided upstream of the hollow-fiber membrane 6.

Next, the ozonizer 22 may be of either creeping discharge type or silent discharge type. However, it is preferable to use a silent-creeping composite ozonizer in which an electric discharge portion has a trench-shaped structure, and which adopts ceramic-coated electrodes and sapphire as a dielectric. It is also preferable for the ozonizer 22 to be capable of stably generating an ozone gas of high concentration, i.e., 10 vol % or higher, which contains neither fine particles nor metallic impurities. Further, the ozonizer 22 preferably makes it possible to vary the gas concentration by controlling the discharge voltage on the basis of an external signal from the arithmetic circuit 21, e.g. a sequencer as will be explained hereinafter.

The ozonizer 22 is supplied with $O_2$ gas 9 and $N_2$ gas 13 as raw material gases in the composition ratio of 99:1 under a pressure of 1.0 kg·f/cm² or more, preferably about 1.5 kg·f/cm², to generate ozone gas 10. The ozone gas 10 is allowed to flow outside the hollow-fiber membrane 6 and thus diffused and dissolved in the water being treated through the membrane 6.

As shown in FIG. 1, the direction of flow of the gas outside the hollow-fiber membrane 6 may be either the same or contrary with respect to the flow of water. However, it is preferable to supply the gas in a counterflow manner in order to effectively utilize the concentration gradient between the ozonized water and the ozone gas. Thus, the gas is supplied as an up-flow from the bottom of the hollow-fiber membrane 6, thereby being dissolved in the water.

Figure 3:
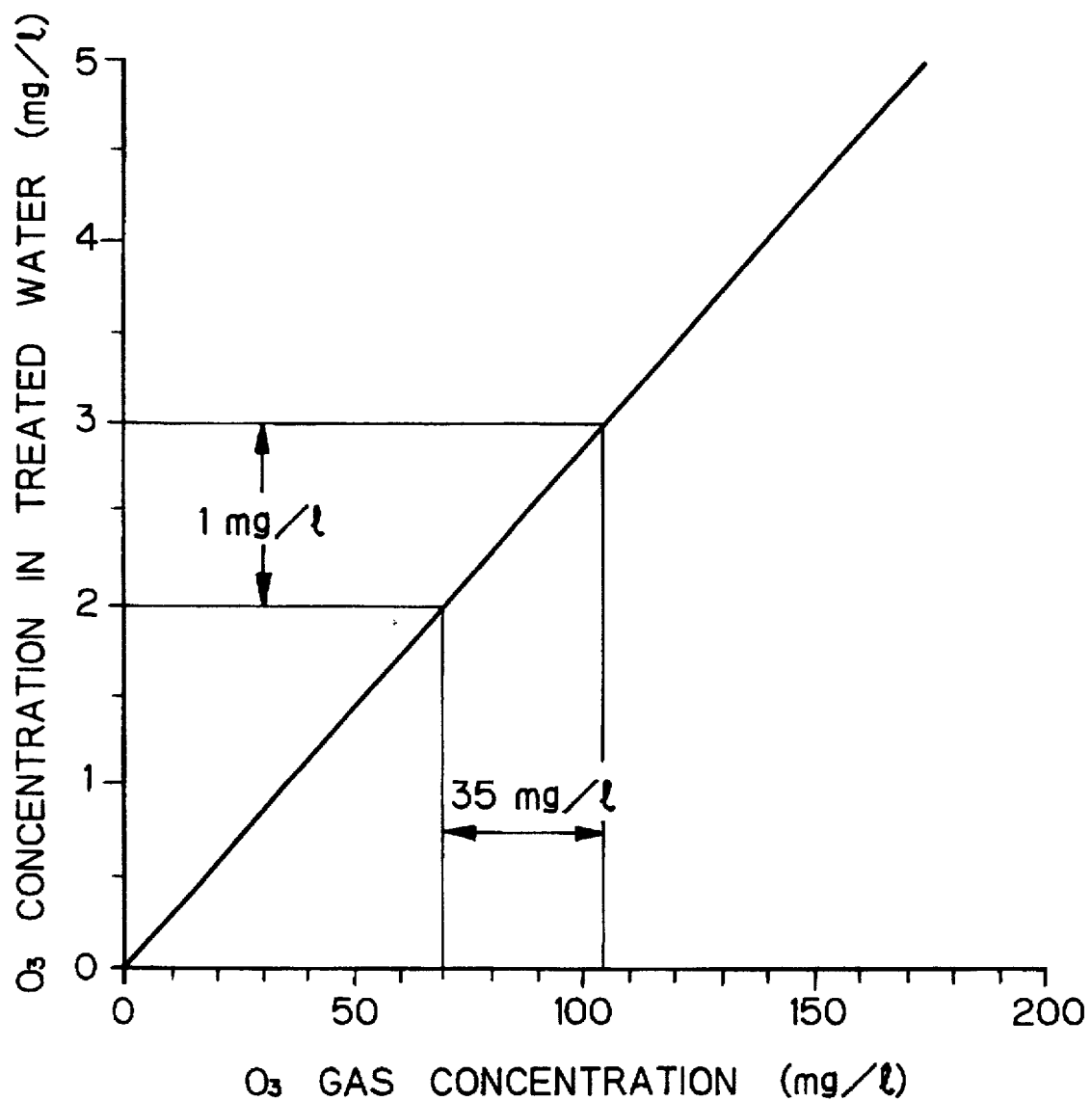
FIG. 3 is a graph showing the relationship between the ozone gas concentration and the ozone concentration in the water treated by the apparatus.

FIG. 3 shows the relationship between the ozone gas concentration and the ozone concentration in the water treated by the apparatus. The ozone concentration in the treated water is directly proportional to the ozone gas concentration. Accordingly, the ozone gas concentration is the most favorable parameter that is usable to control the ozone concentration in the treated water. In actual control of the ozone concentration in the treated water, a part of the ozonized water branched at the outlet of the hollow-fiber membrane 6 is supplied to the ozonized water concentration meter 7, e.g. an ultraviolet absorption type concentration meter, to measure the ozone concentration, and the measured value is processed in an arithmetic circuit 21, e.g. a sequencer. Thereafter, if necessary, the discharge voltage of the ozonizer 22 is varied to change the ozone gas concentration, thereby controlling the ozone concentration in the treated water.

Next, the exhaust gas coming out of the hollow-fiber membrane 6 is supplied to the exhaust gas decomposing tower 19 in the following stage, in which the ozone is decomposed to oxygen gas. Thereafter, the gas is discharged outside the system through a gas pressure regulating valve 20.

Further, while the apparatus is suspended, the gas pressure regulating valve 20, which is provided downstream of the exhaust gas decomposing tower 19, is opened to make the gas pressure equal to the atmospheric pressure. Alternatively, the system is supplied with a dry gas, e.g. $N_2$ or $O_2$ gas, as a purge gas under pressure from the ozonizer inlet through a gas purge valve 17 or 17' and a purge gas flow regulator 18 or 18' to prevent deterioration of the electric discharge portion of the ozonizer 22 and also prevent impurities from entering the system, thereby limiting the increase of the impurity content in the gas. The purge gas flow rate should be in the range of from 0.1 to 0.5 NL/min or more.

According to the ozonized water producing apparatus described above, when a gas is to be dissolved in water to be treated through a membrane, the water pressure is maintained higher than the gas pressure by controlling the water flow rate and pressure at constant levels with a pump, thereby inhibiting gas bubbles from getting mixed in the water, and thus preventing impurities from being brought into the water by the gas. Moreover, the ozone concentration in the treated water is maintained constant by controlling the ozone gas concentration based on a value measured by an ozonized water concentration meter, thereby making it possible to produce high-purity ozonized water of constant concentration at a constant flow rate and a constant pressure.

The present invention will be described below more specifically by way of examples. It should, however, be noted that the present invention is not necessarily limited to these examples.

EXAMPLE 1

In this example, an apparatus arranged according to the flow sheet of FIG. 2 was employed.

As the gas dissolving membrane or hollow-fiber membrane 6, a membrane module made up of 100 polytetrafluoroethylene hollow-fiber membranes and having a membrane area of 1.0 m² was employed.

As the ozonizer 22, a creeping-silent composite electric discharge type ozonizer was employed; as raw material gases, oxygen gas 9 and nitrogen gas 13 were mixed together in the ratio of 99:1, and the resulting mixed gas was supplied to the ozonizer 22 under a pressure of 1.5 kg·f/cm² and at a flow rate of 2.0 NL/min through the flow regulators 11, 12, 15 and 16, thereby generating ozone gas at about 260 mg/NL (W/V). The ozone gas was then supplied to the hollow-fiber membrane 6.

As the water supply pump 3, a hydrodynamic bearing-equipped infinite variable-speed control type pump having a delivery of 30 L/min and a net pump head of 22 m was employed.

As the ozonized water concentration meter 7, an ultraviolet absorption type concentration meter was employed.

The flow of water to be treated and the flow of the gas will be explained with reference to FIG. 2. First, ultrapure water 1 to be treated was supplied through the pump 3, the flowmeter 4 with a transmitter, and the pressure gauge 5 with a transmitter and allowed to flow inside the hollow-fiber membrane 6. At that time, the water 1 was supplied in the form of a down-flow which enters the hollow-fiber membrane 6 through the top thereof and advances toward the bottom thereof so that the direction of flow of the water 1 was counter to the direction of flow of the gas. As to the gas, on the other hand, the ozone gas 10 generated by the ozonizer 22 was allowed to flow in an up-flow manner outside the hollow-fiber membrane 6, thereby dissolving ozone in the water 1 through the membrane 6. Ozonized water 2 thus produced was supplied to a use point through the water pressure regulating valve 8. At that time, the flow rate and pressure of the treated water were controlled by controlling the rotational speed of the pump 3 and the water pressure regulating valve 8 so that the flow rate was 1.0 m³/h, with an error of ±1%, and the water pressure was 2.00±0.05 kg·f/cm². For the pump 3, a method of changing the pump rotational speed on the basis of processing signal valves output from the flowmeter 4 and the pressure gauge 5 executed in the sequencer or arithmetic circuit 21 was adopted For the control of the ozone concentration in the treated water, the following method was adopted: A part of ozonized water from the outlet of the hollow-fiber membrane 6 was branched and supplied to the ozonized water concentration meter 7, and a measured value was arithmetically processed in the arithmetic circuit 21. Then, the discharge voltage of the ozonizer 22 was varied on the basis of the value processed in the arithmetic circuit 21, thereby changing the ozone gas concentration, and thus controlling the ozone concentration in the treated water. The target ozone concentration in the treated water during the operation of the apparatus was set at 7 mg/L as $O_3$. From the relation between the ozone gas concentration and the ozone concentration in the treated water, shown in FIG. 3, the incipient ozone gas concentration was set at 245 mg/NL (W/V). The above-described concentration control was carried out on the basis of the measured value of the ozone concentration in the treated water at intervals of 5 minutes from the starting of the production of ozonized water.

Figure 4:
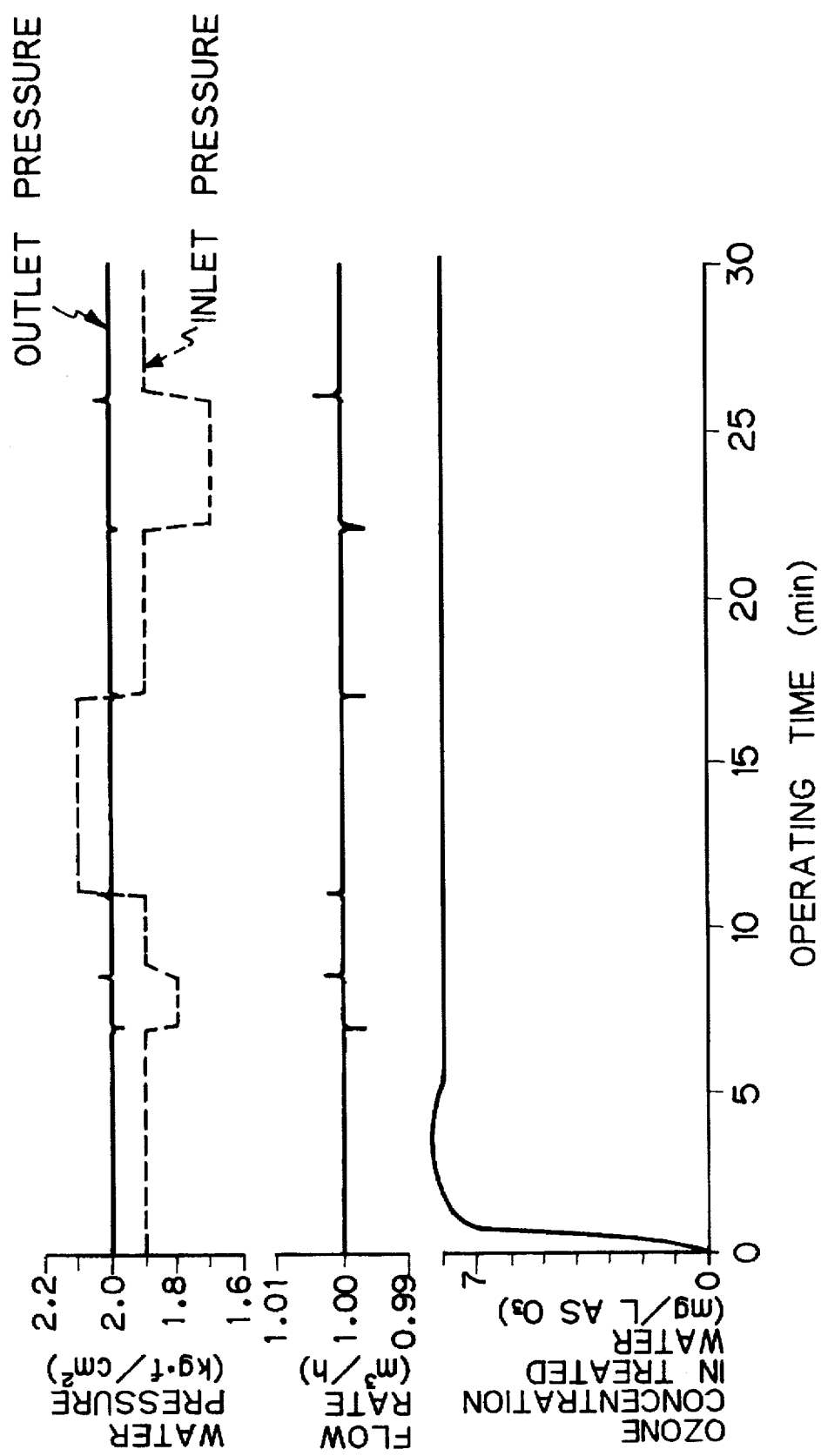
FIG. 4 is a graph showing the water pressure and flow rate at the inlet and outlet of the apparatus, together with the change of ozone concentration in the treated water with time, when the ozonized water producing apparatus according to the embodiment of the present invention is used alone.

FIG. 4 shows the fluctuation of the apparatus inlet water pressure of ultrapure water used as raw water and the fluctuations of the pressure and flow rate of ozonized water at the outlet of the apparatus, together with the change of the ozone concentration in the treated water with time. As shown in FIG. 4, the apparatus inlet water pressure fluctuates from 1.7 kg·f/cm² to 2.1 kg·f/cm², whereas the apparatus outlet water pressure has an error of about 0.05 kg·f/cm² with respect to the target value of 2.0 kg·f/cm². The flow rate has an error of about 0.005 m³/h with respect to the target value of 1.0 m³/h. Thus, the relative error falls within 1%. The ozone concentration in the treated water also almost reached the target value of 7 mg/L as $O_3$ 3 minutes after the start of the production, and reached 7.25 mg/L as $O_3$ 5 minutes after the start of the production. After the concentration control had been executed on the basis of that value, the ozone concentration in the treated water maintained approximately 7 mg/L as $O_3$. Thus, it was possible to obtain ozonized water of constant concentration at a constant pressure and a constant flow rate.

Table 1 shows the results of analysis of ultrapure water used as raw water and ozonized water produced.

TABLE 1

| Elements | Raw water | Ozonized water |
|---|---|---|
| Na (ppt) | <20 | <20 |
| Mg (↓) | <5 | <5 |
| Al (↓) | <50 | <50 |
| Si (↓) | <1000 | <1000 |
| K (↓) | <5 | <5 |
| Cr (↓) | <20 | <20 |
| Mn (↓) | <10 | <10 |
| Fe (↓) | <10 | <10 |
| Ni (↓) | <5 | <5 |
| Cu (↓) | <5 | <5 |
| Pb (↓) | <5 | <5 |
| F⁻ (ppb) | <0.2 | 5–6 |
| $NO_3^-$ (↓) | <0.02 | 1–2 |
| Cl⁻ (↓) | <0.01 | <0.01 |
| $PO_4^-$ (↓) | <0.1 | <0.1 |
| $SO_4^{2-}$ (↓) | <0.02 | <0.02 |
| TOC (ppb) | 1.5–3.4 | 2.3–3.2 |
| 0.2 μm fine particles (particles/ml) | 9.0 | 7.8 |

In Table 1, the contents of metals such as Na, Mg, etc. in the ozonized water are equal to those in the raw water, and all of them are less than the limit of detection. Further, TOC and fine particles in the ozonized water also show numerical values substantially equal to the values of those in the ultrapure water used as raw water. No increase in the impurity content is recognized. Regarding anions, there is a slight increase in the content of F⁻ and $NO_3^-$ ions. However, the F⁻ ions are those eluted from the Teflon piping or other member, and the $NO_3^-$ ions are derived from the raw material gases. That is, since the raw material gases contain nitrogen gas, a nitrogen oxide is formed by electric discharge when ozone is generated, and a part of the nitrogen oxide is dissolved in the water being treated to form $NO_3^-$ ions. The contents of these anions are on the order of several ppb; which is an extremely small amount as an impurity content.

EXAMPLE 2

Next, an example in which semiconductor wafer cleaning equipment was connected to the outlet use point of the ozonized water producing apparatus according to the present invention will be explained with reference to FIG. 5, which schematically illustrates the flow of the process.

Figure 5:
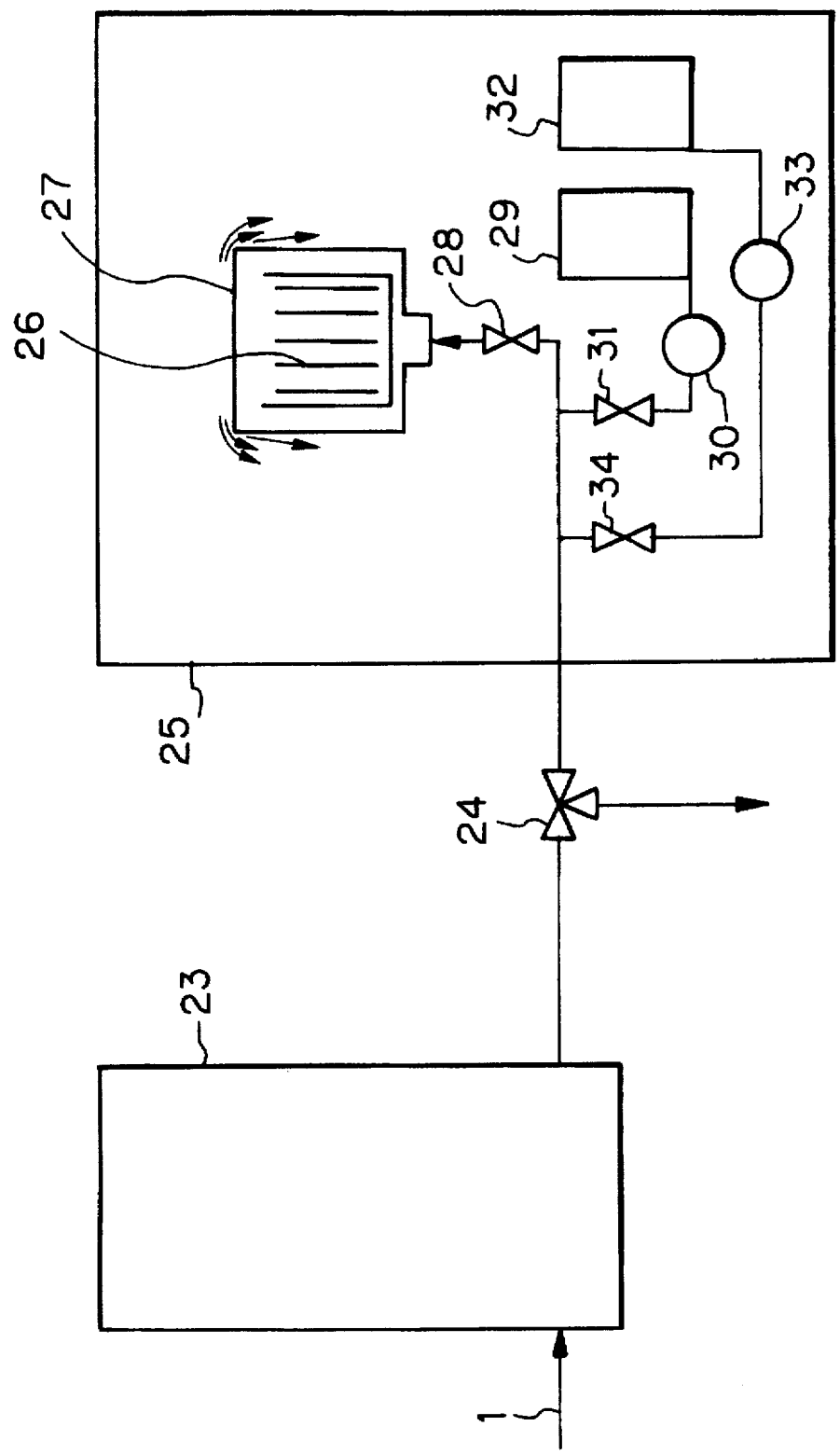
FIG. 5 illustrates the flow of an example in which the ozonized water producing apparatus according to the embodiment of the invention is used with semiconductor wafer cleaning equipment connected to the outlet of the apparatus.

In FIG. 5, ozonized water coming out of an ozonized water producing apparatus 23 is supplied to wafer cleaning equipment 25, which is provided downstream of the apparatus 23. The water cleaning equipment 25 includes a cleaning tank 27 made of quartz in which wafers 26 to be cleaned by the ozonized water are received, an inlet valve 28 to the cleaning tank 27, chemical tanks 29 and 32 containing chemicals to be added to the ozonized water therein, chemical supply pumps 30 and 33 and chemical supply valves 31 and 34. The ozonized water eventually flows into the cleaning tank 27 from the bottom thereof through a cleaning equipment inlet drain valve 24 and the cleaning tank inlet valve 28, and overflows from the top of the cleaning tank 27, thereby cleaning wafers. It should be noted that starting of the ozonized water producing apparatus 23 and the supply of ozonized water to the wafer cleaning equipment 25 were executed by an automatic operation in which a start signal from the cleaning equipment side was received at the ozonized water producing apparatus 23.

Figure 6:
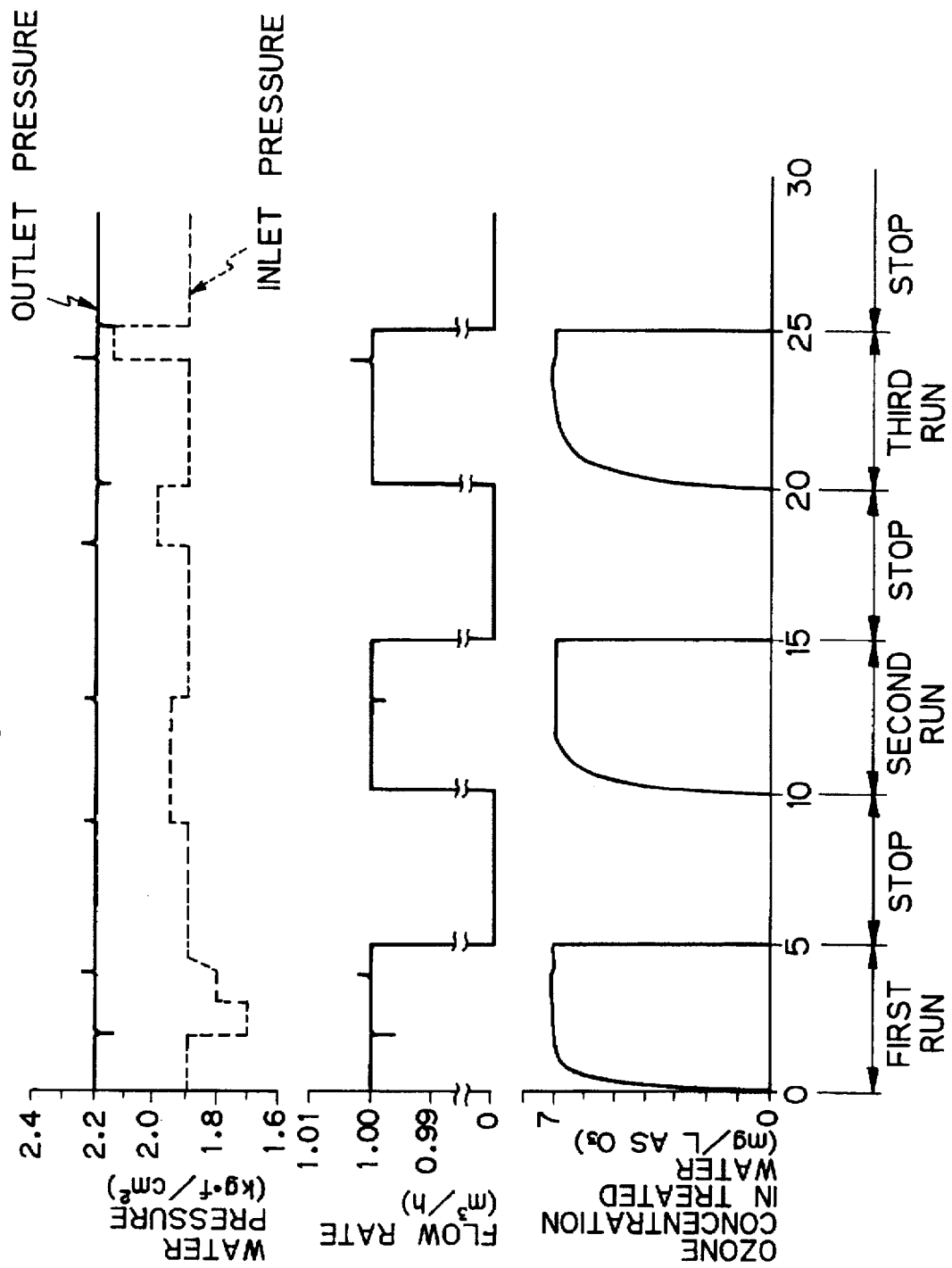
FIG. 6 is a graph showing the water pressure and flow rate at the inlet and outlet of the apparatus, together with the change of the ozone concentration in the treated water with time, when the ozonized water producing apparatus is used in the flow of FIG. 5, the graph further showing an operating sequence.

FIG. 6 shows the fluctuation of the apparatus inlet water pressure of ultrapure water used as raw water and the fluctuations of the pressure and flow rate of ozonized water at the outlet of the apparatus, together with the change of the ozone concentration in the treated water with time; it also shows an operating sequence. As shown in FIG. 6, although the apparatus inlet, i.e., pump inlet water pressure fluctuates from 1.7 kg·f/cm² to 2.15 kg·f/cm², the apparatus outlet water pressure during the operation falls within an error range of 0.05 kg·f/cm² around 2.2 kg·f/cm², and the flow rate fluctuates in a range of 0.005 m³/h with respect to the target value of 1.0 m³/h. Thus, the relative error falls within 1%. The reason why the apparatus outlet water pressure during the operation is centered at 2.2 kg·f/cm² is that there is a back pressure of about 0.2 kg·f/cm² in the orifices of piping and valves on the cleaning equipment side and in the cleaning tank.

It will be understood from the change of the ozone concentration in the treated water with time that, since the concentration control operation is carried out at intervals of 2 minutes, in the first run the control operation is carried out 4 minutes after the start of the run, and in the third run the control operation is carried out twice, i.e. 2 minutes and 4 minutes after the start of the run, thereby enabling ozonized water of about 7 mg/L as $O_3$ to be produced and supplied.

As has been detailed above, the ozonized water producing apparatus of the present invention provides the following advantages: When pressurized ozone gas, generated by an electric discharge type ozonizer, is to be dissolved in water to be treated through a hollow-fiber membrane, the water pressure inside the hollow fibers is maintained higher than the ozone gas pressure, and as a means for maintaining the water pressure in this way, an infinite variable-speed control type pump is provided upstream of the hollow-fiber membrane. Further, the ozone concentration in the treated water is controlled through an ozonized water concentration meter, which is provided downstream the hollow-fiber membrane, thereby making it possible to prevent the treated water from containing tiny bubbles and impurities and to supply ozonized water of constant concentration at a constant pressure and a constant flow rate. The ozonized water producing method of the invention also provides similar advantages.

The present invention is applicable to process water, sterilized water, and cleaning water, which are used in the electronic, medical and other industries in which high-purity water is required.

What is claimed is:

1. An ozonized water producing method in which a pressurized ozone gas generated by an electric discharge type ozonizer is dissolved in water to be treated through a hollow-fiber membrane, characterized in that a water pressure inside the hollow-fiber membrane is maintained higher than the pressure of the ozone gas supplied to the outside of the hollow-fiber membrane to prevent tiny bubbles and impurities from getting mixed in the water being treated, and an ozone concentration in treated water is controlled on the basis of the concentration of the ozone gas.

2. An ozonized water producing method according to claim 1, wherein said water pressure is higher than the ozone gas pressure by 0.1 kg·f/cm² or more.

3. An ozonized water producing method according to claim 1, wherein said water pressure inside the hollow-fiber membrane is controlled by controlling a rotational speed of an infinite variable-speed control type pump provided for supplying a water to said hollow-fiber membrane.

4. An ozonized water producing method according to claim 3, wherein the rotational speed of said infinite variable-speed control type pump is controlled based on flow rate and pressure of a water supplied to said hollow-fiber membrane by said pump.

5. An ozonized water producing method according to claim 4, wherein said rotational speed of said pump is so controlled that flow rate and pressure of a water at an outlet of said apparatus is maintained at a constant level.

6. An ozonized water producing method according to claim 1, wherein said ozone gas concentration is controlled by varying a discharge voltage of said electric discharge type ozonizer.

7. An ozonized water producing method according to any one of claims 1 to 6, wherein, when no ozonized water is produced, a gas piping which extends from an inlet of said ozonizer to an outlet of said hollow-fiber membrane is purged with a dry gas.

8. An ozonized water producing method according to claim 7, wherein said dry gas is an oxygen gas and/or nitrogen gas which is (are) supplied to said ozonizer when ozonized water is produced.

9. An ozonized water producing apparatus in which a pressurized ozone gas generated by an electric discharge type ozonizer is dissolved in water to be treated through a hollow-fiber membrane, characterized by comprising: an infinite variable-speed control type pump which is provided upstream of said hollow-fiber membrane to maintain a water pressure inside hollow fibers higher than a pressure of said ozone gas supplied to outside of said hollow-fiber membrane and to control the water pressure and flow rate; and a control mechanism for controlling an ozone concentration in treated water on the basis of the concentration of the ozone gas.

10. An ozonized water producing apparatus according to claim 9, wherein a flowmeter and a pressure gauge are provided upstream of said hollow-fiber membrane, and said apparatus includes a control mechanism for processing signal values output from said flowmeter and pressure gauge in an arithmetic circuit to control said infinite variable-speed control type pump.

11. An ozonized water producing apparatus according to claim 9, wherein said ozone concentration control mechanism includes: an ozonized water concentration meter provided downstream of the hollow-fiber membrane; an arithmetic circuit for processing a value measured by said concentration meter; and a voltage varying device for varying a discharge voltage of said electric discharge type ozonizer on the basis of the processed value.

12. An ozonized water producing apparatus according to any one of claims 9 to 11, wherein said hollow-fiber membrane is a polytetrafluoroethylene porous hydrophobic membrane which is permeable to gases, e.g. oxygen, nitrogen, etc., but impermeable to water, said membrane having a pore diameter distribution centered in a range of from 0.01 µm to 1 µm.

13. An ozonized water producing apparatus according to any one of claims 9 to 11, further comprising means for purging a gas piping which extends from an inlet of said ozonizer to an outlet of said hollow-fiber membrane with a dry gas when no ozonized water is produced.

* * * * *